United States Patent [19]

Ishikura et al.

[11] Patent Number: 4,473,623
[45] Date of Patent: Sep. 25, 1984

[54] LEAD ACID BATTERY AND METHOD OF STORING IT

[75] Inventors: Yoshikazu Ishikura, Hirakata; Akira Watanabe, Neyagawa, both of Japan

[73] Assignee: Sanyo Electric Co., Ltd., Osaka, Japan

[21] Appl. No.: 452,054

[22] Filed: Dec. 22, 1982

[30] Foreign Application Priority Data

Dec. 28, 1981 [JP] Japan .................................. 56-215703
Mar. 17, 1982 [JP] Japan .................................. 57-43253
Sep. 17, 1982 [JP] Japan .................................. 57-162702

[51] Int. Cl.³ .......................................... H01M 10/06
[52] U.S. Cl. ....................................... 429/48; 429/49; 429/60; 429/225
[58] Field of Search ................... 429/48, 225, 228, 59, 429/60, 204, 49

[56] References Cited

U.S. PATENT DOCUMENTS

| | | | |
|---|---|---|---|
| 2,951,106 | 8/1960 | Ruetschi | 429/225 X |
| 3,227,583 | 1/1966 | Carlisle | 429/255 X |
| 3,862,861 | 1/1975 | McClelland et al. | 429/57 |
| 4,373,015 | 2/1983 | Peters et al. | 429/57 |

Primary Examiner—Anthony Skapars
Attorney, Agent, or Firm—Hubbell, Cohen, Stiefel & Gross

[57] ABSTRACT

A lead acid battery comprising: a positive plate; a negative plate having higher capacity than said positive plate; a separator interposed between said plates; and an electrolyte, said plates and said separator being impregnated with said electrolyte, the amount of said electrolyte being limited so that a free electrolyte is not substantially present therein, the theoretical capacity of said positive plate being more than 2.5 times as much as the theoretical capacity of said electrolyte, and thus having an excellent discharge storage property; and a method of storing the retainer type lead acid batteries including above battery to improve the discharge storage property comprising permitting said battery to stand under such a condition that a load is connected between said positive and negative plates when said battery is allowed to stand after the discharge has been finished.

6 Claims, 7 Drawing Figures

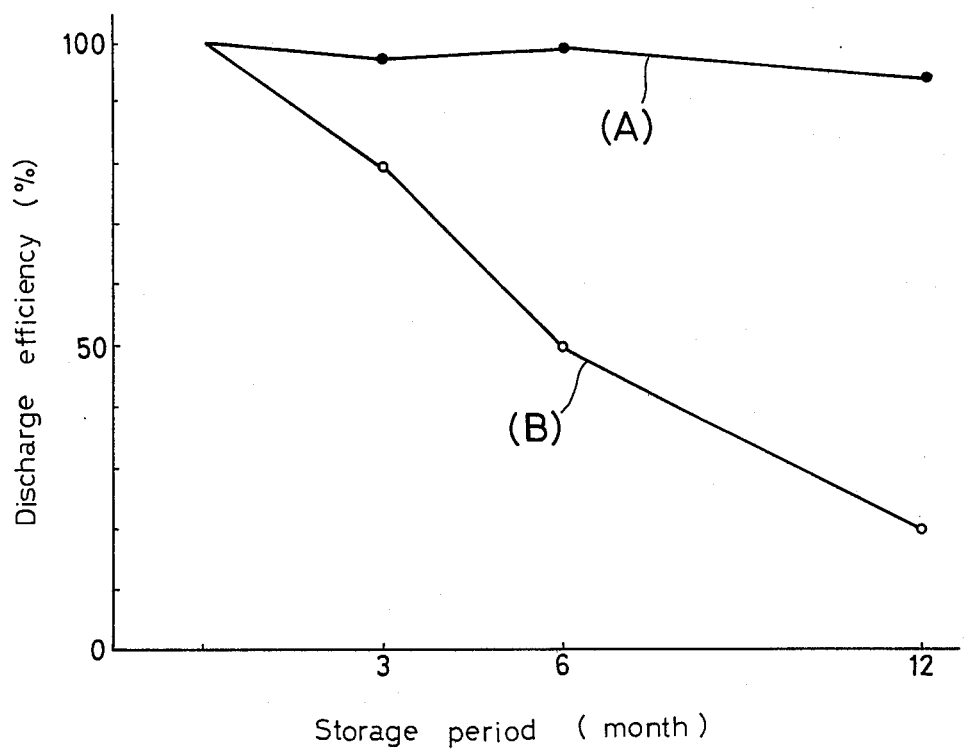
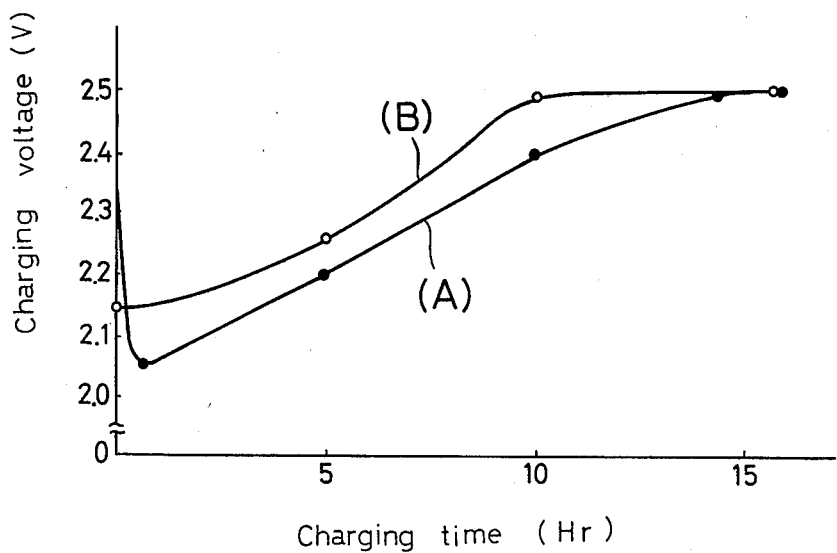

LEAD ACID BATTERY AND METHOD OF STORING IT

BACKGROUND OF THE INVENTION

1. Field of the Invention

This invention relates to an improvement of the so-called retainer type lead acid battery wherein a capacity of a negative plate is made higher than a capacity of a positive plate and an amount of electrolyte is limited, and a method of storing it. The object of the present invention is to improve a discharge storage characteristic.

2. Description of the Prior Art

A conventional retainer type lead acid battery increases a capacity of negative plate 10 to 30% as compared with that of the positive plate and limits an amount of the electrolyte, so that firstly the positive plate is fully charged and oxygen generated at the positive plate in overcharging is absorbed and consumed at the negative plate.

However, when the battery of this kind is allowed to stand for a long period of time after being discharged a corroded layer of a positive collector surface composed of lead or lead alloy, which supports a positive active material in a positive plate, is changed to an inactive $PbSO_4$ (lead sulfate) layer to increase a resistance between the positive active material and the positive collector. As a result, the charging efficiency is lowered and the capacity is not sufficiently recovered so as to deteriorate the battery characteristics.

Now, according to the investigation of the inventors, the mechanism by which the corroded layer of the positive collector surface is changed to the inactive $PbSO_4$ layer after the discharge storage as described above may be considered as follows. That is, a corroded layer of $PbO_2$ (lead dioxide) may be produced on the surface of the positive collector due to anodic oxidation by repeating charge and discharge cycles after assembling the battery. Although there is no problem since this $PbO_2$ layer exists as $PbO_2$ layer in the repeating cycles of usual charge and discharge under only the discharge condition, Pb used as the positive collector metal may be ionized to become $Pb^{++}$ ions if the battery is allowed to stand for a long period of the time under the condition, and Pb of $PbO_2$ layer serving as the corroded layer may become $Pb^{++}$ ions similarly. The $PB^{++}$ ions may be bonded with $SO_4$ ions present in an electrolyte to produce an inactive $PbSO_4$ layer.

In order to avoid such a phenomenon, it has been known (Japanese Published Unexamined Patent Application No. 56-91568) that a positive plate in a lead acid battery is composed of a positive active material and a positive grid in which the positive grid is buried in the internal portion of the positive active material and the outer surface of the positive active material is strongly pressed to prevent unwanted expansion thereof. However, the disadvantage described will not be sufficiently eliminated.

On the one hand, in the battery of this kind, the electrolyte may take part in a battery reaction as shown in the following relation.

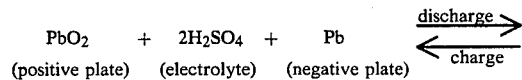

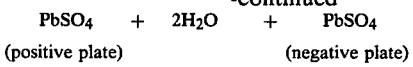

According to the reaction, it will be apparent that the capacity of the battery of this kind is controlled by the capacity of the negative and positive plates, and the amount of electrolyte.

In order to suppress that the $PbO_2$ layer of the positive collector surface is changed to the inactive $PbSO_4$ layer under the discharge storage condition, the inventors have found the electrolyte control type battery structure, that is, the structure in which the battery capacity is controlled by the amount of the electrolyte, and have energetically investigated the same with the result that the present invention has been accomplished.

SUMMARY OF THE INVENTION

The present invention is to provide a lead acid battery which includes a positive plate, a negative plate having higher capacity than the positive plate, a separator interposed between these plates, and an electrolyte, the plates and the separator being impregnated with the electrolyte, the amount of the electrolyte being limited so that the free electrolyte is not substantially present therein, the theoretical capacity of the positive plate being more than 2.5 times as much as the theoretical capacity of the electrolyte, further to provide a lead acid battery wherein the theoretical capacity of the positive plate is more than 3 times as much as the battery capacity, and more further to provide a lead acid battery wherein hollow portions of a positive grid are filled with below 65 wt % of a positive active material against the total amount of the positive active material to be used when the positive plate is formed of the positive grid and the positive active material.

These lead acid batteries have excellent discharge storage characteristics, for example, the battery characteristic is not lowered even if it is allowed to stand for a long period of time after discharge.

Further, the present invention is to provide a storing method for permitting a battery to stand under the condition that a load is connected between negative and positive plates when allowed to stand for a long period of time after a retainer type lead acid battery, including a lead acid battery according to the invention, has finished the discharge. According to the method of the invention, the discharge storage characteristic of the retainer type lead acid batteries can be further improved.

BRIEF DESCRIPTION OF THE DRAWINGS

FIG. 2 to 7 are graphs showing discharge storage characteristics of batteries according to embodiments of the present invention and batteries of comparative examples.

DETAILED DESCRIPTION OF THE PREFERRED EMBODIMENTS

Figure 1:
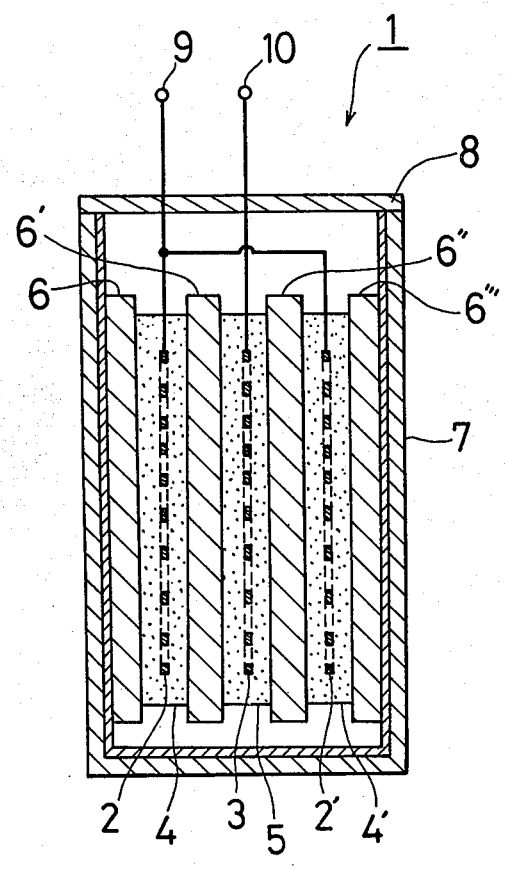
FIG. 1 is a cross-sectional view of a lead acid battery according to one embodiment of the present invention.

The fundamental structure of the lead acid battery according to the present invention is similar to that of the conventional retainer type lead acid battery, which includes a plurality of negative and positive plates, a separator inserted between plates, an electrolyte substantially absorbed by the plates and the separator, and a casing having positive and negative terminals connected to plates.

A collector to be employed in the positive plate as well as the negative plate may be a grid of a lead material such as pure lead, lead-calcium alloy or lead-calcium-tin alloy or the like which is formed by casting, punching or expand machining; or a plate of said lead material which is formed by rolling.

The positive and negative plates may be manufactured by mixing litharge (lead monoxide) and water, and if necessary a binder such as polytetrafluoroethylene and one or a mixture of such additives as barium sulfate, carbon black, ligninsulfonate and the like, by means of a mixer to make a paste material, rolling the paste material by means of a rolling mill to form a calendered sheet, pressing the sheet to the collector so as to obtain a desired weight and thickness, and dying the pressed material.

A separator made of glass fibers, rubbers with fine pores, polyvinyl chloride, polyolefins, phenol resin-impregnated paper sheets, etc is inserted between the negative and positive plates, and these members are accumulated to provide a group of plates or electrodes. After the group of the plates is placed in a battery casing, a desired amount of an electrolyte of sulfuric acid having the specific gravity of 1.2 to 1.4 is poured into the casing, thereby permitting the plates and separator to absorb and maintain the electrolyte. Thereafter, a cover is arranged on the casing, and negative and positive collector terminals are welded to provide a lead acid battery having desired capacity according to the present invention. The battery is then charged to enable one to use it.

Further, it may be preferable that phosphoric acid is added to sulfuric acid thus employed in order to prevent softening and delamination of the positive active material and that an addition agent composed mainly of sodium sulfate or magnesium sulfate is added thereto so as to increase the discharge capacity of the battery or to recover the sulfation. The charging is generally carried out by applying a constant current of 0.5 to 1.5 A/dm$^2$ to the plates after pouring a desired amount of electrolyte into the casing.

The lead acid battery according to the present invention may be constituted so as to provide a spiral structure which is produced by accumulating belt-shaped negative and positive plates and the separators.

In the specification, the theoretical capacity of the positive or negative plate means the theoretical electrical capacity (A/H, ampere/hour) of the positive or negative plate, and the theoretical capacity of the electrolyte means the theoretical electrical capacity (A/H) of the electrolyte, and further the battery capacity means the electrical capacity (A/H) that the battery includes substantially.

According to the present invention, the retainer type lead acid battery, wherein the theoretical capacity of the positive plate is more than 2.5 times as much as the theoretical capacity of the electrolyte, is provided. However, when the magnification is less than 2.5, the discharge storage characteristic will be rapidly lowered with decreasing the magnification.

In the electrolyte limiting type battery such as the lead acid battery according to the present invention, the charging is usually accomplished by applying the constant current to plates after the electrolyte is poured into the battery. However, when the electrolyte is poured into the battery, all of the electrolyte is almost absorbed and maintained by the negative and positive plates and the separators, and the greater part of the electrolyte is absorbed and maintained by the separators because it has higher wetting heat than the negative and positive plates.

To increase the theoretical capacity of the positive plate by any magnification as compared with the theoretical capacity of the electrolyte is to increase the amount (g) of the positive active material per unit amount (cc) of the electrolyte. Accordingly, when the theoretical capacity of the positive plate is excessively higher than the theoretical capacity of the electrolyte, it is extremely difficult that the electrolyte permeates uniformly into all of pores of the plates. As a result, although the charging is sufficiently carried out at portions into which the electrolyte permeates sufficiently, there will arise the problem that the charging is not accomplished at portions that the permeation of the electrolyte is insufficient.

The inventors of the present invention have found that the uncharged portions are not produced at the surface of the positive plate and occur in the internal portion of the positive plate and that since the internal resistance is increased in the battery having such remained uncharged portions, a desired charging is not accomplished to lower the discharge characteristic.

In the case of a usual charging method (for example, a constant current charging technique which is carried out by a applying a constant current of 0.5 to 1.5 A/dm$^2$ from the positive plate to the negative plate through the electrolyte.), it has become clear that the magnification of the theoretical capacity of the positive plate to the capacity of the electrolyte may be made less than 4.5 times. However, such an upper limit will arise if methods are adopted for sufficiently charging the positive plate by using a low temperature charging taking the charging condition, that is, changing the current density at the charging, lowering the concentration of the electrolyte, and adding an addition agent to the electrolyte.

To increase the magnification is to increase the amount of the active material of the positive plate, and this means that the utilization rate of the positive active material is decreased. The lowering of the utilization rate brings the decrease of the energy density (WH/Kg) per unit weight and the energy density (WH/L) per unit volume. Consequently, for the practical battery it is not preferable that the theoretical capacity of the positive plate is greatly increased as compared with the theoretical capacity of the electrolyte.

According to the present invention, although the lead acid battery having the theoretical capacity of the positive plate showing a value 3 times as much as the battery capacity is provided, the discharge storage characteristic is rapidly lowered with decreasing the magnification in the case where the theoretical capacity of the positive plate is less than the magnification. However, when the theoretical capacity of the positive plate is extremely increased as compared with the battery capacity, sufficient and insufficient formed portions are caused since it is difficult that the electrolyte permeates uniformly into the positive plate as described above. Therefore, since the internal resistance is increased by the uniformed portions, the proper charging is not carried out to lower the discharge characteristic. Accordingly, it is preferable that the magnification of the theoretical capacity of the positive plate to the battery capacity is made less than 5.5 times in the case of usual charging method.

Further, if the theoretical capacity of the positive plate is increased to more than 2.5 times as much as the theoretical capacity of the electrolyte and increased to more than 3 times as much as the battery capacity, the discharge storage characteristic can be greatly improved.

Furthermore, when the positive collector of the battery according to the present invention is the grid, it is preferable that the ratio of the amount of the positive active material filled in hollow portions of the positive grid to the total amount of the positive active material is made low. The ratio is usually below 65 wt %, preferably below 60 wt %. That is, the surface of the grid is not exposed to the outer surface of the active material, and it is prevented that the discharge reaction of the active material proceeds to the interface between the grid and the active material by removing the surface of the active material layer away from the grid surface as much as possible. Consequently, it is suppressed that the inactive PbSO$_4$ is produced on the grid surface, thereby remarkably improving the discharge storage characteristic.

According to the retainer type battery including the battery of the present invention as described above, a load is connected between the negative and positive plates when the battery is allowed to stand after finishing the discharge, thereby carrying out the storing method. The discharge storage characteristic can be improved by accomplishing the storing method of the present invention.

Next, the present invention will be described in detail with Examples and experiments.

FIG. 1 shows the rough cross-sectional view of a battery according to the Example and comparative example. These batteries were manufactured as follows.

Lead-calcium alloy plate was punched to provide negative grids (2,2') with the size of 50×50×1 mm and positive grid (3) with the size of 50×50×2 mm. Litharge and water were mixed by a mixer to produce an active paste material. The paste material was rolled by a rolling mill so as to obtain a sheet of the thickness of 0.7 mm and 1.0 mm. The grid was then sandwiched between two active material sheets with the size of 50×50 mm, and these members were pressed to produce negative plates (4,4') and one positive plate (5).

Two negative plates (4,4') and one positive plate thus obtained were alternately accumulated through glass fiber separators (6,6',6'',6''') to provide a group of plates. After the group of plates was arranged in a battery casing, a sulfuric acid electrolyte having the specific gravity of 1.30 was poured into it to impregnate plates and separators therewith. Thereafter, the casing was covered with a cover (8) to provide a lead acid battery (1) having the battery capacity of 1.1 AH, and the battery was charged by a constant current density of 0.5 to 1.5 A/dm$^2$.

EXAMPLES 1 TO 4 AND COMPARATIVE EXAMPLES 1 to 2

10 cc of sulfuric acid electrolyte with the specific gravity of 1.30 was added to respective batteries during manufacturing to obtain the theoretical capacity of the electrolyte of 1.42 AH (ampere/hour). The theoretical capacity of the electrolyte, and the ratio (D: hereinafter called the filling rate) of the amount of the positive active material filled in hollow portions of the positive grid to the total amount of the positive active material were variously changed to produce lead acid batteries shown in Table 1.

TABLE 1

| Battery No. | A (m AH) | B (m AH) | A/B | C (%) | D (%) | E (AH) | A/E |
|---|---|---|---|---|---|---|---|
| Example | | | | | | | |
| 1 | 3550 | 1420 | 2.5 | 40 | 40 | 1.1 | 3.2 |
| 2 | " | " | " | 50 | 50 | " | " |
| 3 | " | " | " | 60 | 60 | " | " |
| 4 | 3850 | " | 2.7 | 60 | 60 | " | 3.5 |
| Comparative Exam. | | | | | | | |
| 1 | 3000 | 1420 | 2.1 | 60 | 60 | 1.1 | 2.7 |
| 2 | " | " | " | " | 75 | " | " |

A: theoretical capacity of the positive plate;
B: theoretical capacity of the electrolyte;
C: pore rate of grid;
D: filling rate; and
E: battery capacity.

Figure 2:
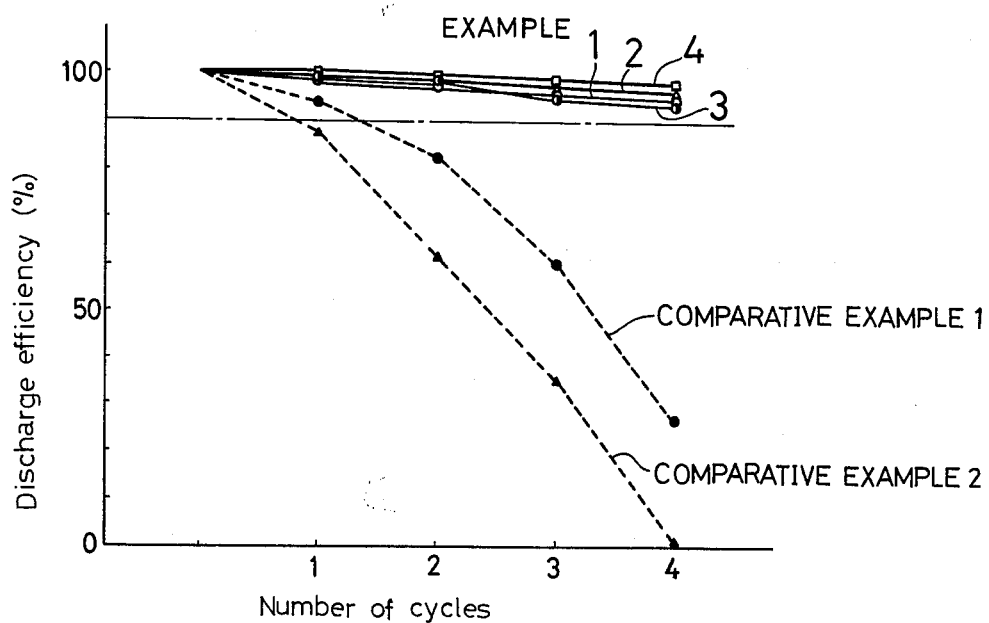

A:

FIG. 2 shows that discharge storage characteristics of batteries of Examples 1 to 4 are compared with those of Comparative examples 1 to 2. The measurement was accomplished as follows. Batteries after charging were charged at a constant voltage (2.5 V) for 16 hours, and discharged at a current of 0.2 c to a discharge stop voltage (1.7 V). At this time, the resulting discharge capacity was regarded as 100. After the completion of the discharge, batteries were allowed to stand at room temperature for 3 months. Thereafter, they were charged at a constant voltage (2.5 V) for 16 hours and discharged at a current of 0.2 c until the discharge stop voltage of 1.7 V was obtained. And then the discharge capacity after each of 4 cycles was measured.

According to FIG. 2, on batteries of Examples 1 to 4 wherein the amount of the positive active material filled in hollow portions of the positive grid is less than 65 wt % of the total amount of the positive active material and the theoretical capacity of the positive plate is more than 2.5 times as much as the theoretical capacity of the electrolyte, the discharge capacity above 90% is obtained with respect to the initial discharge capacity after the discharge storage test of 4 cycles. Therefore, it is apparent that the charging is efficiently carried out.

On the contrary, the discharge storage characteristic is remarkably reduced when the theoretical capacity of the positive plate is less than 2.5 times as much as the theoretical capacity of the electrolyte even if the filling rate D is less than 65 wt % as shown by the battery of the Comparative example 1. Further, it is apparent that the discharge storage characteristic is greatly lowered as compared with the Comparative example 1 when the filling rate exceeds 60 wt % as shown by the Comparative example 2 and the theoretical capacity of the positive plate is less than 2.5 times as much as the theoretical capacity of the electrolyte.

EXAMPLES 5 to 6 AND COMPARATIVE EXAMPLES 3 to 4

8.5 cc of sulfuric acid electrolyte with the specific gravity of 1.30 was added to respective batteries during manufacturing to provide lead acid batteries having the theoretical capacity of the electrolyte of 1.2 AH and the filling rate of 67 wt %. The theoretical capacity of the electrolyte was variously changed to obtain batteries as shown in Table 2.

TABLE 2

| Battery No. | A (m AH) | B (m AH) | A/B | C (%) | D (%) | E (AH) | A/E |
|---|---|---|---|---|---|---|---|
| Example | | | | | | | |
| 5 | 3500 | 1200 | 2.9 | 67 | 67 | 1 | 3.5 |
| 6 | 3000 | " | 2.5 | " | " | " | 3.0 |
| Comparative exam. | | | | | | | |
| 3 | 2500 | 1200 | 2.1 | 67 | 67 | 1 | 2.5 |
| 4 | 2000 | " | 1.7 | " | " | " | 2.0 |

A: theoretical capacity of positive plate;
B: theoretical capacity of electrolyte;
C: pore rate of grid;
D: filling rate; and
E: battery capacity.

Figure 3:
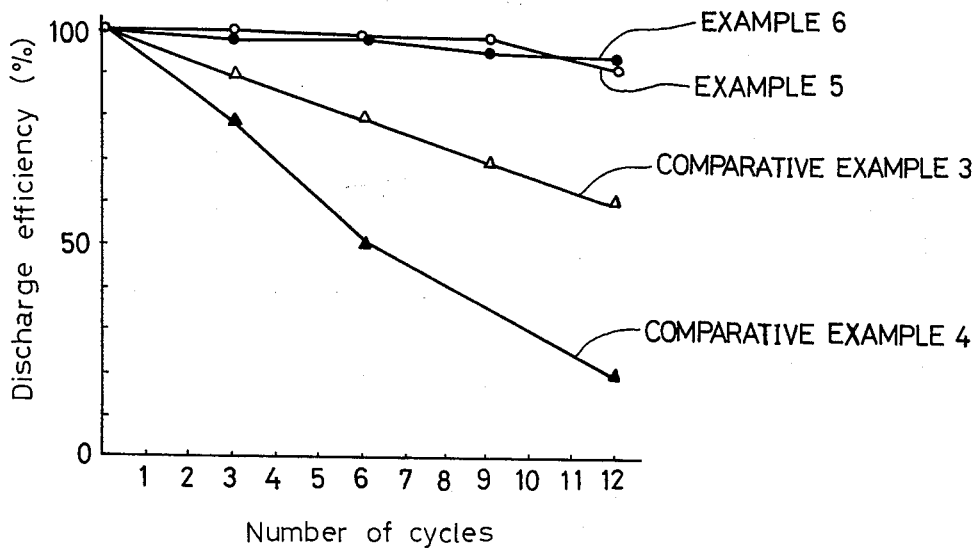

The discharge storage characteristics were compared with respect to batteries of Examples 5 to 6 and Comparative examples 3 to 4, and showed in FIG. 3. The measurement was carried out as follows. The respective batteries after forming were charged at a constant voltage of 2.5 V for 16 hours, and discharged at a current 0.2 c to a discharge stop voltage (1.7 V). At this time, the resulting discharge capacity was regarded as 100. After the batteries were allowed to stand for 3, 6 and 12 months under the discharge condition, they were charged at a constant voltage of 2.5 V for 16 hours. Thereafter, the batteries were discharged at a current of 0.2 c until the discharge stop voltage of 1.7 V was obtained, thereby measuring the discharge capacity.

As shown in the batteries of Examples 5 to 6, when the theoretical capacity of the positive capacity of the 2.5 times as much as the theoretical capacity of the electrolyte and is more than 3 times as much as the battery capacity, the discharge capacity above 90% is obtained with respect to the initial capacity even if the filling rate is 67 wt % which is slightly higher than 65 wt % and the batteries are allowed to stand for a long period of time of 12 months. On the contrary, the discharge efficiency is remarkably lowered in the case where the theoretical capacity of the positive plate is less than 2.5 times as much as the theoretical capacity of the electrolyte, the filling rate is more than 65 wt % and the theoretical capacity of the positive plate is less than 3.0 times as much as the battery capacity as shown in Comparative examples 3 to 4.

As it is apparent from the Examples and Comparative examples, if the theoretical capacity of the positive plate is more than 2.5 times as much as the theoretical capacity of the electrolyte, the discharge storage characteristic of batteries is greatly improved. Further, if the theoretical capacity of the positive plate is more than 3 times as much as the battery capacity and the filling rate is less than 65 wt % in using the grid as the collector, the discharge storage characteristic of batteries is remarkably improved. That is, the active material near the grid remains in the form of $PbO_2$ by concentrically producing $PbSO_4$, which isproduced during discharge, at a position remote from the neighborhood of the grid, that is, at the plate surface. When the cross-sectional surfaces the positive plates near the grids, wherein the discharge storage had been carried out with respect to batteries of the Examples and Comparative examples, were observed using an optical microscope and a scanning type electron microscope, it was recognized that the remaining condition of $PbO_2$ is remarkably good in the batteries according to the Examples as compared with that of the batteries of Comparative examples.

As is described above, if the discharge product ($PbSO_4$) is concentrically produced at the surface of the plate, it is difficult that the electrolyte is diffused into the neighborhood of the grid when the discharge storage is accomplished, and $SO_4^{--}$ is consumed by $PbO_2$ serving as the active material remaining in the plate even if the electrolyte is diffused into the neighborhood of the grid. Therefore, it can be suppressed that the corroded layer ($PbO_2$ layer) at the grid surface is changed to an inactive $PbSO_4$ layer.

EXPERIMENT 1

The following experiment was carried out using two batteries A and B made in the same way as the battery of the Comparative example 1.

That is, the batteries after charging were initially charged and discharged at a desired current. After finishing the discharge, a resistance load (20Ω), which corresponded to a current of 0.1 c, was connected to the battery A and allowed to stand according to the storing method of the invention. On the contrary, the battery B was allowed to stand under an open circuit condition, and the battery performance of both batteries was compared.

The measurement was carried out as follows. Lead acid batteries were charged at a constant voltage (2.5 V) for 16 hours, and discharged at a current of 0.2 c to a discharge stop voltage (1.7 V). At this time, the resulting discharge capacity was regarded as 100. After the discharge was finished, the battery (A) according to the method of the invention and the comparative battery (B) were allowed to stand at room temperature for 3 months, 6 months and 12 months, respectively. Thereafter, they were charged at a constant voltage (2.5 V) for 16 hours and discharged at a current of 0.2 c so as to obtain the discharge stop voltage of 1.7 V, thereby measuring the discharge capacity of each battery.

FIG. 4 shows that the discharge storage characteristic of the battery (A) adopted to the method of the invention is compared with that of the comparative battery (B). In the comparative battery (B), the discharge capacity after the storage becomes below 20% with respect to the initial discharge capacity after it is allowed to stand for 12 months. On the contrary, according to the battery (A) of the invention the discharge capacity above 90% is maintained with respect to the initial discharge capacity, and it is apparent that the discharge storage characteristic is improved.

Figure 6:
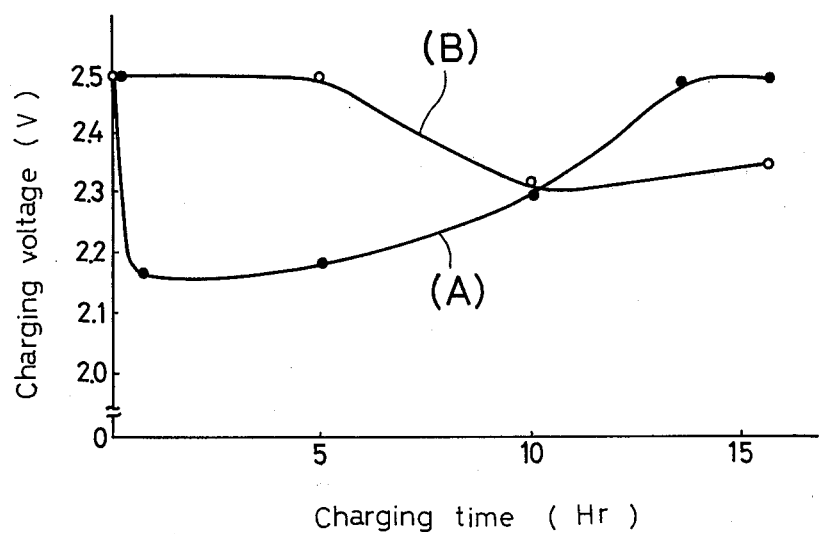
Figure 7:
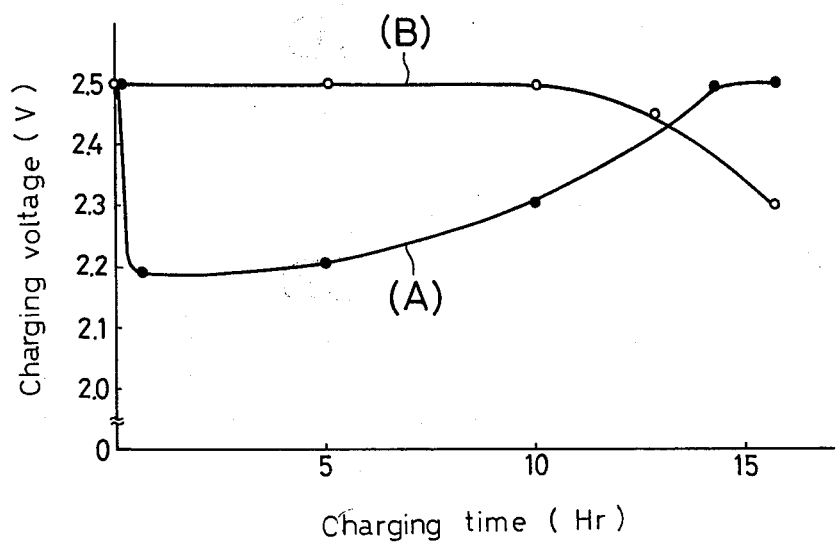

FIG. 5 to 7 show charging characteristics in the case where a constant voltage charge is accomplished on both the battery (A) according to the method of the invention and the comparative battery (B) after they are allowed to stand. FIG. 5 shows that the storage period is 3 months, FIG. 6 shows that the storage period of time is 6 months, and FIG. 7 shows that the storage period of time is 12 months, respectively. According to the battery (A) of the invention, even if the storage period of time is made long, the battery voltage does not arise to represent the facility accepting the charging current. On the contrary, according to the comparative battery (B), the battery voltage arises with increasing the storage period of time. After the battery (B) is allowed to stand for 12 months, the battery voltage during charging is increased to the setting voltage (2.5 V) to lower the acceptance of the current during charging. Consequently, the effect of the method of the invention is evident.

Further, the same experiment as described above was carried out on the battery of the Example 6 wherein the theoretical capacity of the positive plate was more than 2.5 times as much as the theoretical capacity of the electrolyte. However, a better discharge storage characteristic was obtained according to the storing method of the invention as compared with the method wherein the battery was allowed to stand under the open circuit condition.

On the one hand, the corroded layer of $PbO_2$, which is produced on the surface of the positive collector by repeating charge and discharge cycles, becomes $Pb^{++}$ ions by the storage of long period of time when the battery is allowed to stand under the open circuit condition, and the resulting $Pb^{++}$ ions are reacted and bonded with $SO_4^{--}$ ions remaining in the electrolyte to produce the inactive $PbSO_4$ layer. Consequently, the increase of the voltage brings about during charging after the storage, thereby causing the charge deterioration. On the other hand, as shown in the method of the invention, if the battery is allowed to stand under the condition that the load was connected between negative and positive plates, the discharge due to the load connection becomes the minute current discharge at the last period of discharge since the discharge current flows through the load, corresponding to the battery voltage. Therefore, the discharge is uniformly finished from the center of the surface portion of the plate under such a condition that the discharge of the active material proceeded greatly, and $SO_4^{--}$ ions remaining in the electrolyte are almost consumed. Consequently, since the prodution of $PbSO_4$ produced by reacting $Pb^{++}$ ions in the $PbO_2$ corroded layer of the collector with $SO_4^{--}$ ions is suppressed, there is no problem that the energizing performance of the charging current is not lowered by the $PbSO_4$ layer which is produced in $PbO_2$ corroded layer caused by the discharge storage for a long period of time. Therefore, good effect for charging, particularly the constant voltage charging is obtained even after the storage of long period of time, and it is possible to prevent the lowering of the battery characteristics.

Further, as means for connecting the load between negative and positive plates of the lead acid battery that the discharge has been finished, in order to maintain the battery under the condition of the load connection, a change-over control device for connecting the load between negative and positive plates after discharge may be previously provided in the lead acid battery. The connection of the load between negative and positive plates may be controlled by detecting the degree of the discharge whether the closed circuit voltage of the battery is lower than the discharge stop voltage (1.7 V) or higher. For example, the change-over control device may be constituted as follows. That is, the change-over control device may be employed, which comprises a detecting means for detecting the closed circuit voltage of the lead acid battery having negative and positive terminals, a comparator means for comparing the detected voltage with the discharge stop voltage, a change-over hold circuit means which operates depending upon the output of the comparator means when the detected voltage is equal to the discharge stop voltage, and a switch means for connecting a load between negative and positive terminals by the output of the circuit means.

According to the method of the present invention as described above, since the lead acid battery that the discharge has been finished is allowed to stand under such a condition that the load is connected between negative and positive terminals, it can be suppressed that $PbO_2$ corroded layer of the collector surface is changed to the inactive $PbSO_4$ layer, and it can be prevented that the battery characteristics are deteriorated even if the battery is allowed to stand for a long period of time after discharge. Therefore, the industrial value will be greatly increased.

What is claimed is:

1. A lead acid battery comprising:
a positive plate, said plate comprising a positive grid and positive active material, said positive grid having hollow portions therein, said hollow portions being filled with less than about 65 wt.% of said positive active material based on the total amount of said positive active material employed, a negative plate having higher capacity than said positive plate;
a separator interposed between said plates; and an electrolyte, said plates and said seperator being impregnated with said electrolyte, the amount of said electrolyte being limited so that a free electrolyte is not substantially present therein, the theoretical capacity of said positive plate being more than 2.5 times as much as the theoretical capacity of said electrolyte.

2. A lead acid battery in accordance with claim 1, wherein said theoretical capacity of said positive plate is more than 3 times as much as the battery capacity.

3. A method of storing a lead acid battery including a positive plate, a negative plate having higher capacity than said positive plate, a separator interposed between these plates, and an electrolyte, said plates and said separator being impregnated with said electrolyte, the amount of said electrolyte being limited so that a free electrolyte is not substantially present therein, comprising: permitting said lead acid battery to stand under such a condition that a load is connected between said positive and negative plates when said lead acid battery is allowed to stand after the discharge has been finished.

4. A method of storing a lead acid battery in accordance with claim 3, wherein the theoretical capacity of said positive plate of said lead acid battery to be stored is more than 2.5 times as much as the theoretical capacity of said electrolyte.

5. A method of storing a lead acid battery in accordance with claim 3, wherein the theoretical capacity of said positive plate of said lead acid battery to be stored is more than 3 times as much as the battery capacity.

6. A method of storing a lead acid battery in accordance with claim 3, wherein said positive plate of said lead acid battery to be stored comprises a positive grid and a positive active material, said positive grid having hollow portions therein, said hollow portions being filled with less than 65 wt % of said positive active material based on the total amount of said positive active material employed.

* * * * *